United States Patent [19]
Dombrowski et al.

[11] Patent Number: 5,600,946
[45] Date of Patent: Feb. 11, 1997

[54] SOLID PROPELLANT DUAL PULSE ROCKET MOTOR LOADED CASE AND IGNITION SYSTEM AND METHOD OF MANUFACTURE

[75] Inventors: Daniel C. Dombrowski; Thomas J. Frey; Andrew G. Nevrincean, all of Elkton, Md.; Clyde E. Carr, Jr., Lincoln University, Pa.

[73] Assignee: Thiokol Corporation, Ogden, Utah

[21] Appl. No.: 469,759

[22] Filed: Jun. 6, 1995

Related U.S. Application Data

[63] Continuation of Ser. No. 234,308, Apr. 29, 1994, abandoned.

[51] Int. Cl.⁶ ............................................. F02K 9/00
[52] U.S. Cl. ................................................ 60/253
[58] Field of Search ........................... 60/244, 245, 250, 60/253, 254, 255, 256

[56] References Cited

U.S. PATENT DOCUMENTS

| | | |
|---|---|---|
| 826,293 | 7/1906 | Unge . |
| 3,122,884 | 3/1964 | Grover et al. . |
| 3,392,673 | 7/1968 | King .................................... 60/256 |
| 3,397,539 | 8/1968 | Schubert . |
| 3,457,726 | 7/1969 | Trotel . |
| 3,857,239 | 12/1974 | Brock et al. ............................. 60/250 |
| 3,908,364 | 9/1975 | Lefebvre et al. . |
| 4,085,584 | 4/1978 | Jones et al. . |
| 4,866,930 | 9/1989 | Fling et al. ............................. 60/250 |
| 4,936,092 | 6/1990 | Andrew . |
| 4,956,971 | 9/1990 | Smith ................................... 60/253 |
| 4,972,673 | 11/1990 | Carrier et al. . |
| 4,999,997 | 3/1991 | Grosgebauer et al. ................... 60/255 |

FOREIGN PATENT DOCUMENTS

| | | | |
|---|---|---|---|
| 2328958 | 1/1975 | Germany | ............... 60/256 |

*Primary Examiner*—Timothy S. Thorpe
*Attorney, Agent, or Firm*—Madson & Metcalf; Ronald L. Lyons

[57] ABSTRACT

A solid propellant dual pulse rocket motor has a pressure vessel containing two pulse grains separated by a barrier insulator. An igniter assembly disposed at a fore end of the pressure vessel selectively ignites a first pulse grain from a central channel within the grain. The igniter assembly also ignites a second pulse grain by ejecting hot combustion gases onto the fore end of the grain. Using such an ignition arrangement, a dual pulse rocket motor may be constructed using standard off-the-shelf ignition components.

11 Claims, 5 Drawing Sheets

SOLID PROPELLANT DUAL PULSE ROCKET MOTOR LOADED CASE AND IGNITION SYSTEM AND METHOD OF MANUFACTURE

This application is a continuation of U.S. application Ser. No. 08/234,308, filed Apr. 29, 1994, for SOLID PROPELLANT DUAL PULSE ROCKET MOTOR LOADED CASE AND IGNITION SYSTEM AND METHOD OF MANUFACTURE now abandoned.

BACKGROUND OF THE INVENTION

1. Field of the Invention

The present invention relates to rockets and other self-propelled missiles and projectiles, and more specifically, to solid propellant rocket motors for such devices which are capable of providing multiple propulsive impulses to the vehicle in which they are installed.

2. Description of the Related Art

Motors for rockets, other types of propelled missiles and the like generally are of two types. The first, the liquid propellant motor, has a tank containing a liquid fuel such as liquid hydrogen or ammonia, and a tank containing a liquid oxidizer such as liquid oxygen, nitric acid or fluorine. The two liquids are mixed together in a combustion chamber in a specific proportion and at flow rates designed to cause the liquid to spontaneously combust. The combustion products are expelled from the rocket's exhaust nozzle, thereby providing a thrusting force to propel the rocket. Liquid propellant motors are useful for their ability to be precisely controlled; stopped and restarted; and checked out, fired and calibrated before actual use. Liquid propellant motors also are advantageous in that they provide a wide range of specific impulse ratings, i.e., the amount of thrust per unit mass of fuel burned per unit time; and a relatively long burn time.

The other major type of rocket motor is the solid propellant motor. In solid propellant systems, the rocket is propelled by a solid fuel charge or "grain" that initially is ignited by an electric or pyrotechnic igniting device. As the grain burns, it generates exhaust gases and other combustion products which are expelled through a nozzle at the end of the rocket. The combustion products are expelled from the rocket's exhaust nozzle, thereby providing a thrusting force to propel the rocket. The advantages of the solid propellant motor are its relatively simple structural design and its ease of use.

In many applications, it is desirable to use a solid propellant motor that can provide two separate and distinct propulsive impulses, i.e., a dual pulse motor. For example, the first pulse in a dual pulse motor could be used to fire a missile towards its target. When the missile is near the target, the second pulse could be fired to accelerate the missile, increase its force on impact with the target, and enhance the damage imparted to the target.

Several types of dual pulse motors have been developed. For example, U.S. Pat. No. 4,936,092 to Andrew discloses a system in which grains for the different pulses may be contained in separate, detachable stages. When the grain for one pulse has been entirely consumed, its stage may be jettisoned and a new stage ignited. This arrangement, however, entails the duplication of relatively complicated mechanical parts, the coordination of operations therebetween, and additional weight and manufacturing considerations.

Also, as shown in U.S. Pat. No. 3,122,884 to Grover et al., the grains may be contained in separate combustion chambers within a single stage, where the chambers have separate nozzles or share a common nozzle. Since this scheme still entails some duplication of parts, the propellant load that can be accommodated in the motor is necessarily limited and the cost and weight of the motor are increased. Also, the multiple nozzle configuration limits the size of each nozzle, thereby decreasing the available specific impulse available from the motor.

An alternative to these designs is shown in U.S. Pat. Nos. 3,908,364 to LeFebvre et al. and 4,085,584 to Jones et al. In these systems, the grains for each pulse may be accommodated in a single combustion chamber. To prevent the second grain from igniting once combustion has begun in the first grain, the grains are separated by a thin thermal insulation membrane at their interface. This membrane protects the second grain from inadvertent ignition while the first grain is burning. Once the first grain is spent, a separate igniter initiates combustion of the second grain to begin the second pulse, thereby destroying the membrane and permitting combustion products to exit from the nozzle.

While the above-described prior art systems serve their purpose, they require specialized ignition systems to accommodate the unique combustion characteristics of dual pulse motors. Also, the specialized ignition characteristics of dual pulse motors are fraught with unique problems such as tolerance stack-up and the difficulty of conducting reliable inspections and assemblies.

SUMMARY OF THE INVENTION

It is an object of this invention to provide a solid propellant dual pulse motor that can use standard solid propellant motor ignition train components such as through-bulkhead-initiators (TBIs), explosive transfer assemblies (ETAs) and safe-and-arms (S&As).

It is a further object of the present invention to provide a solid propellant dual pulse motor that which is relatively easy to inspect and assemble.

It is yet another object of this invention to provide a solid propellant dual pulse motor that is substantially free from tolerance stack-up considerations and the like.

It is still another object of the present invention to provide a method of manufacturing a solid propellant dual pulse motor that can be performed easily, reliably and inexpensively.

The above objects are achieved by providing a solid propellant dual pulse rocket motor that has a pressure vessel containing two pulse grains separated by a barrier insulator. An igniter assembly disposed at a fore end of the pressure vessel selectively ignites a first pulse grain from a central channel within the grain. The igniter assembly also ignites a second pulse grain by ejecting hot combustion gases onto the fore end of the grain. Using such an ignition arrangement, a dual pulse rocket motor may be constructed using standard off-the-shelf ignition components.

BRIEF DESCRIPTION OF THE DRAWINGS

These and other objects and advantages of this invention will become apparent and more readily appreciated from the following description of the presently preferred exemplary embodiments, taken in conjunction with the accompanying drawings, of which.

DETAILED DESCRIPTION OF THE PRESENTLY PREFERRED EXEMPLARY EMBODIMENTS

Figure 1:
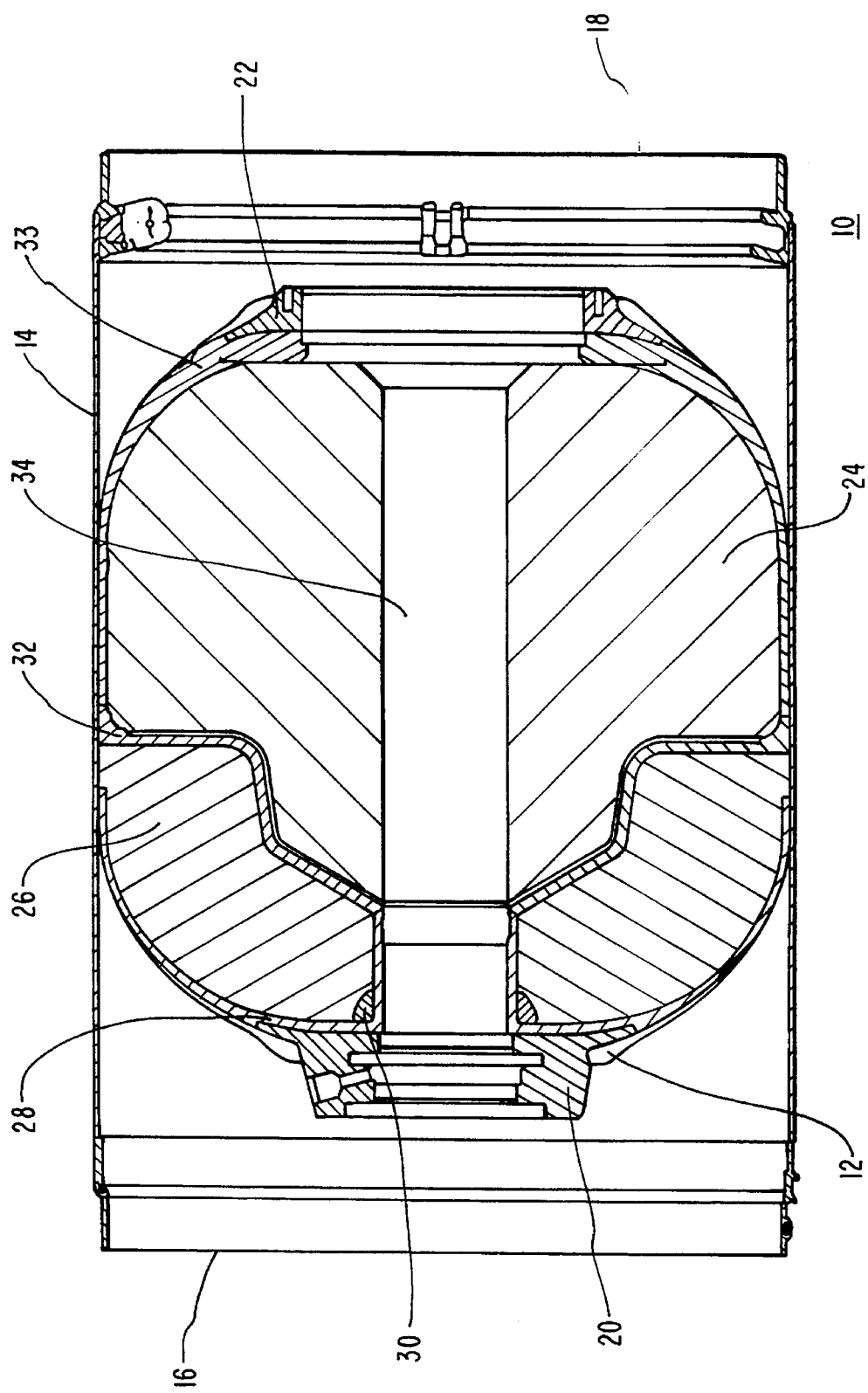
FIG. 1 is a cross-sectional diagram of a case assembly according to the present invention.

The foundation of the present invention is the motor case assembly 10 shown in FIG. 1. The motor case assembly 10 has a pressure vessel 12 disposed within a skirt 14. Preferably, the pressure vessel 12 has a 12.24 inch maximum outer diameter and is made from a filament-wound graphite-epoxy resin composition.

The skirt 14 preferably has a 12.24 inch diameter and is made from a filament-wound graphite-epoxy resin composition. Also, to alleviate any differential strains between the pressure vessel 12 and the skirt 14, it is advantageous to provide adhesive shear plies at the interface between these two components.

It should be noted that FIG. 1 and all other Figures are cross-sectional longitudinal views of the present invention and that, although not shown, the invention and parts contained therein generally have a circular cross-section when viewed axially.

The fore end of the skirt 14 has a fore end ring 16 attached thereto, and the aft end of the skirt 14 has an aft end ring 18 attached thereto. The fore end ring 16 provides for transfer of thrust loads and for mating to motor processing tooling, while the aft end ring 18 supports two nozzle actuators 40 (shown in FIG. 2) and also mates to motor processing tooling. Preferably, the fore ring 16 and aft ring 18 are made from an aluminum alloy and are bonded and riveted to the skirt 14; however, other equivalent suitable materials and bonding techniques will be readily apparent to those skilled in the art.

The pressure vessel 12 has a fore polar boss 20 and an aft polar boss 22 at fore and aft ends, respectively, along its longitudinal axis. The fore polar boss 20 provides for mating and support of the motor igniter assembly 34 (shown in FIG. 2) as described in more detail below, and the aft polar boss 22 mates with the nozzle assembly 38 (also shown in FIG. 2) to support blowout loads. Preferably, the fore polar boss 20 and the aft polar boss 20 each are made from a titanium alloy or other compound having good high temperature characteristics (such as steel or aluminum) as will be apparent to those skilled in the art.

The pressure vessel 12 has a Pulse 1 grain 24 disposed in an aft portion of the interior of the pressure vessel 12 and a Pulse 2 grain 26 disposed in a fore portion thereof. Preferably, the Pulse 1 grain 24 is made from about 44 lb. of an aluminum powder-fueled, hydroxyl-terminated polybutadiene (HTPB) binder composition, and the Pulse 2 grain 26 is made from about 22 lb. of a similar composition having a higher burn rate. In a preferred embodiment, the Pulse 2 grain 26 has about a 68% higher burn rate than the Pulse 1 grain 24.

A fore insulator 28 is disposed between the pressure vessel 12 and the Pulse 2 grain 26 to provide erosion and thermal protection for the pressure vessel 12 and the Pulse 2 grain 26 while Pulse 1 is burning and during the interpulse delay. Additionally, the Pulse 2 grain 26 has a grain support 30 (preferably made from a foam material) centrally disposed at its fore end. Also, a barrier insulator 32 is disposed between the Pulse 1 grain 24 and the Pulse 2 grain 26 to provide similar protection to the aft end of the Pulse 2 grain 26, and an aft insulator 33 is disposed between the aft end of the Pulse 1 grain 24 and the aft end of the pressure vessel 12 for similar reasons. Preferably, the fore insulator 28, the barrier insulator 32 and the aft insulator 33 are made from Kevlar-filled ethylene propylene diene monomer (EPDM) material and include stress-relief boots to provide propellant bondline stress relief during cold-temperature storage and operation.

Figure 2:
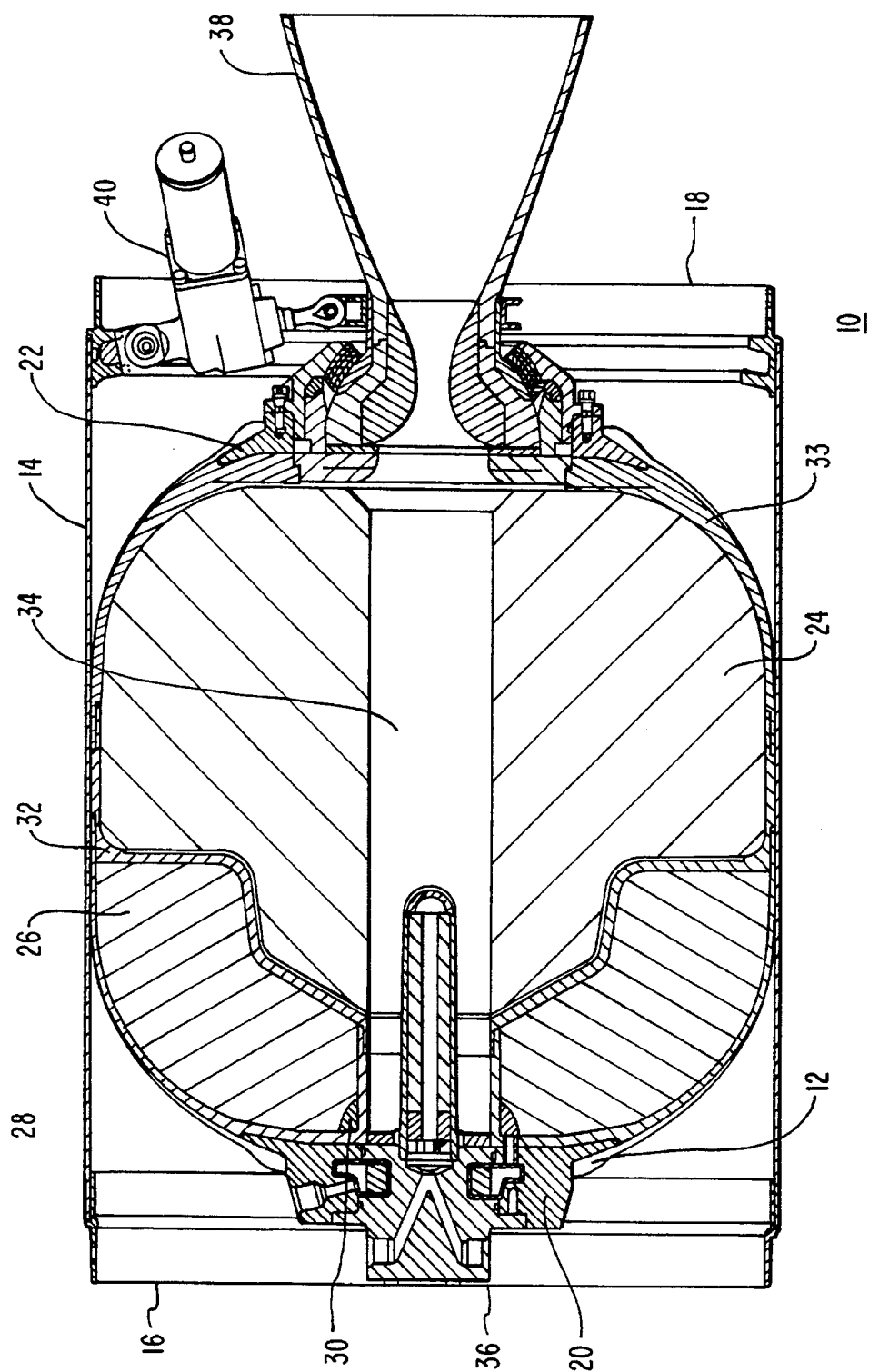
FIG. 2 is a cross-sectional diagram of a solid propellant two pulse rocket motor according to the present invention.

The Pulse 1 and 2 grains 24, 26 and the fore and barrier insulators 28, 32 cooperatively define a central ignition cavity 34 and, as shown in FIG. 2, a motor igniter assembly 36 is bolted to the fore polar boss 20 at a fore end of the ignition cavity 34. In addition to showing the placement of the motor igniter assembly 36 in the pressure vessel 12, this Figure also shows the flexseal thrust vector control (TVC) nozzle 38 and one of its associated actuators 40.

Figure 3:
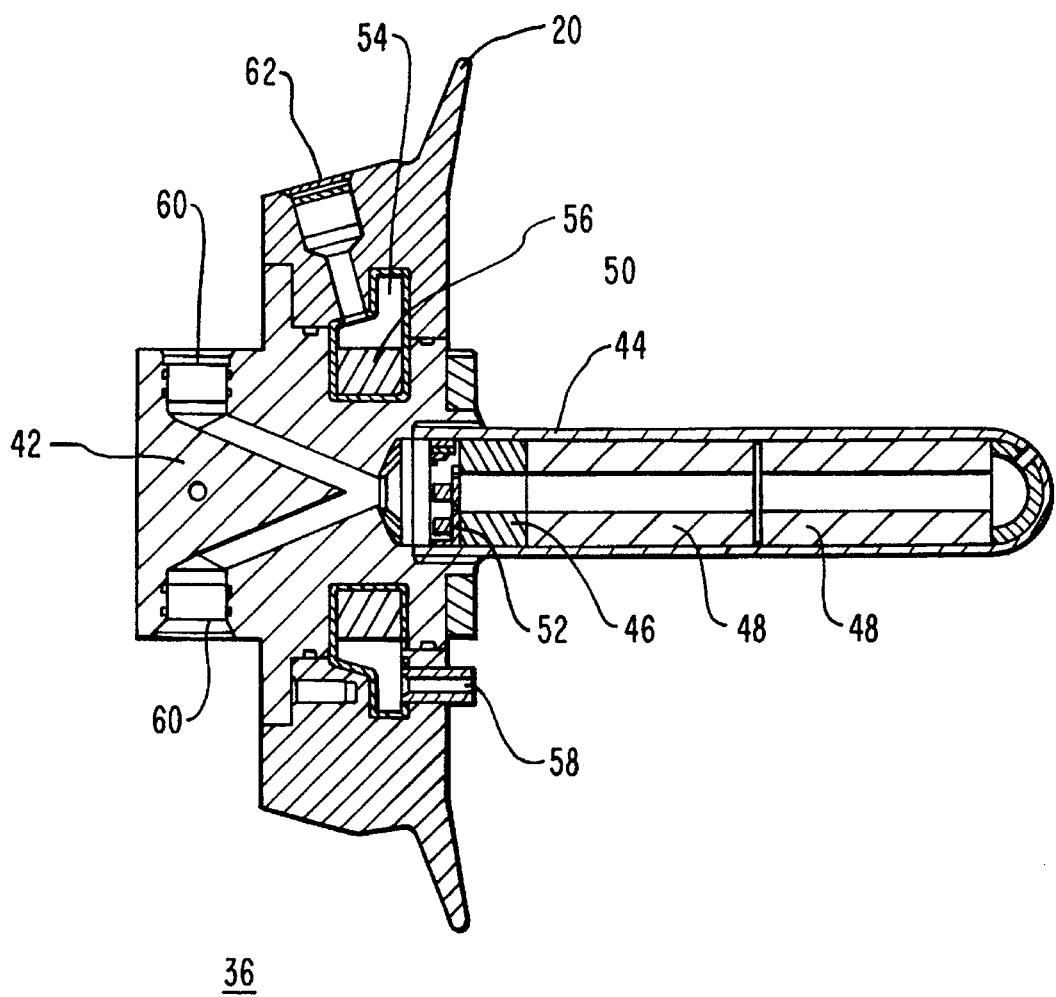
FIG. 3 is an enlarged cross-sectional diagram of a dual pulse igniter assembly according to the present invention.

As shown in FIG. 3, the motor igniter assembly 36 includes an igniter closure 42 and an igniter case 44 projecting therefrom. The igniter closure 42 fits into the fore polar boss 20 and preferably is made of a titanium alloy. The igniter case 44 has three Pulse 1 igniter grains 46, 48, disposed therein. The grains 48 preferably are made from a case-bonded propellant, and the grain 46 preferably is a case-bonded booster propellant. The grains 46, 48 are separated from ignition pellets 50 (preferably $BKNO_3$ pellets) which are separated from the grain 46 by a steel screen 52. When the ignition pellets 50 are ignited by, for example, two squibs or TBIs, they ignite the grains 46, 48, thereby consuming the igniter case 46.

Preferably, the igniter case 46 is made from aluminum or an aluminum alloy; however, any other equivalent composition that is readily consumed during ignition, e.g., magnesium or steel, can be used, as will be apparent to those skilled in the art.

When in place, the igniter closure 42 cooperates with the fore polar boss 20 to define a toroidal chamber 54 containing the Pulse 2 igniter grain 56. One or more nozzle ports 58 which allow ignition gases from the Pulse 2 igniter grain 56 to pass from the toroidal chamber 54 to the interior of the pressure chamber 12. Preferably, the nozzle ports 58 are made from short lengths of silica-phenolic material.

More specifically, when the Pulse 2 grain 56 is ignited by, for example, a squib or TBI, hot gases pass from the toroidal chamber 54 through the nozzle ports 58 and impinge upon the grain support 30 to melt it. In this process, the gases ignite the Pulse 2 propellant grain 28 to rupture the barrier insulator 32 and start the motor's second pulse.

Preferably, the motor igniter assembly includes one or more Pulse 1 pressure ports 60 and one or more Pulse 2 pressure ports 62 through which the pressures generated during the ignition process may be measured.

Figure 4:
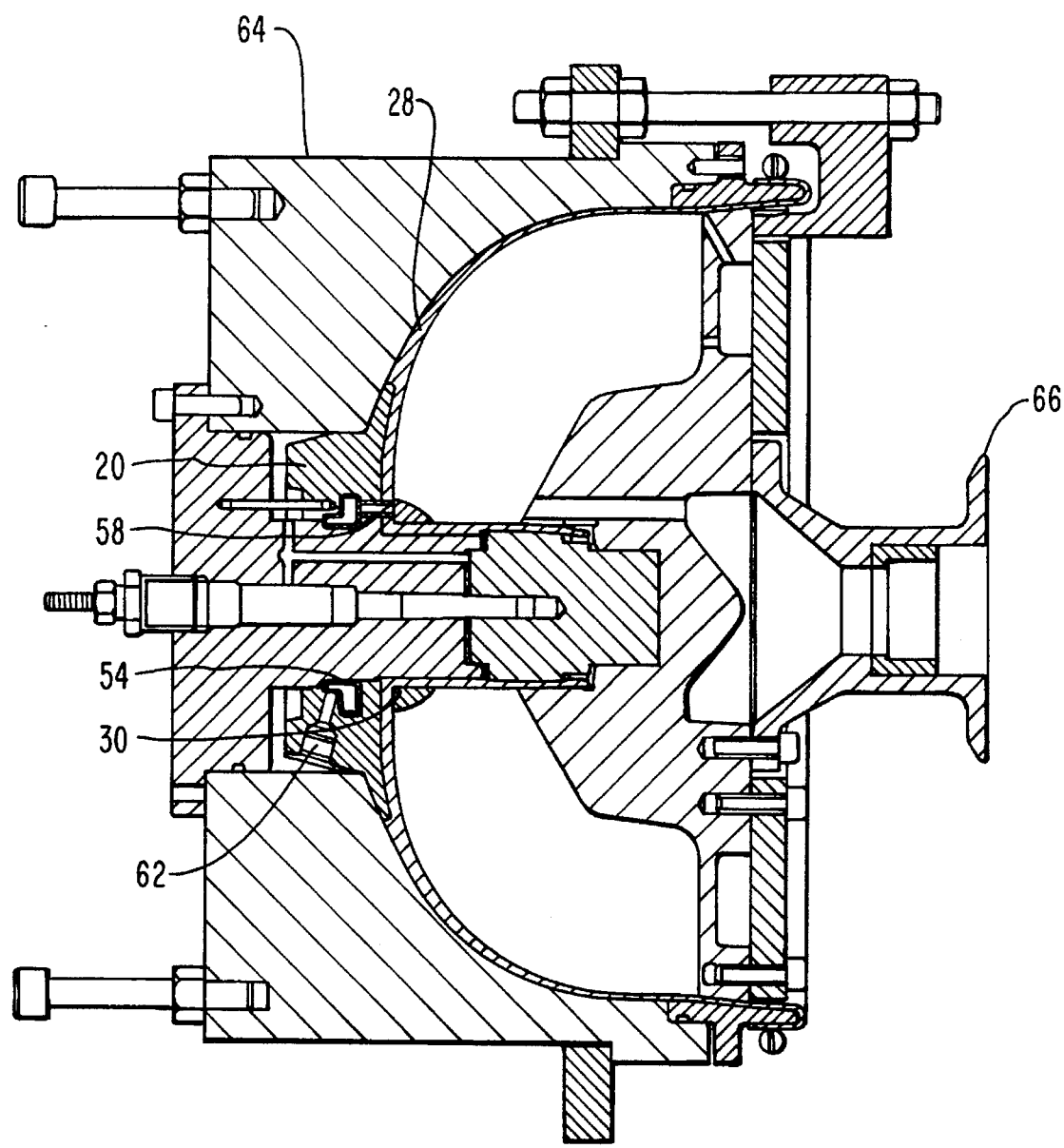
FIG. 4 is a cross-sectional diagram of a casting assembly for forming a Phase 2 grain according to the present invention.

A method of making the above-described invention will now be described with reference to FIG. 4. First, the fore, barrier and aft insulators 28, 32 and 33 are fabricated. Then, the fore insulator 28 is placed in Pulse 2 casting tooling 64, the grain support 30 is fitted around the central throat of the fore insulator 28 and the Pulse 2 grain 26 is cast under vacuum to remove all air from the Pulse 2 grain area and to ensure that the barrier insulator 32 is pushed out to its proper shape. Next, the Pulse 2 grain 26 is pressure cured.

Figure 5:
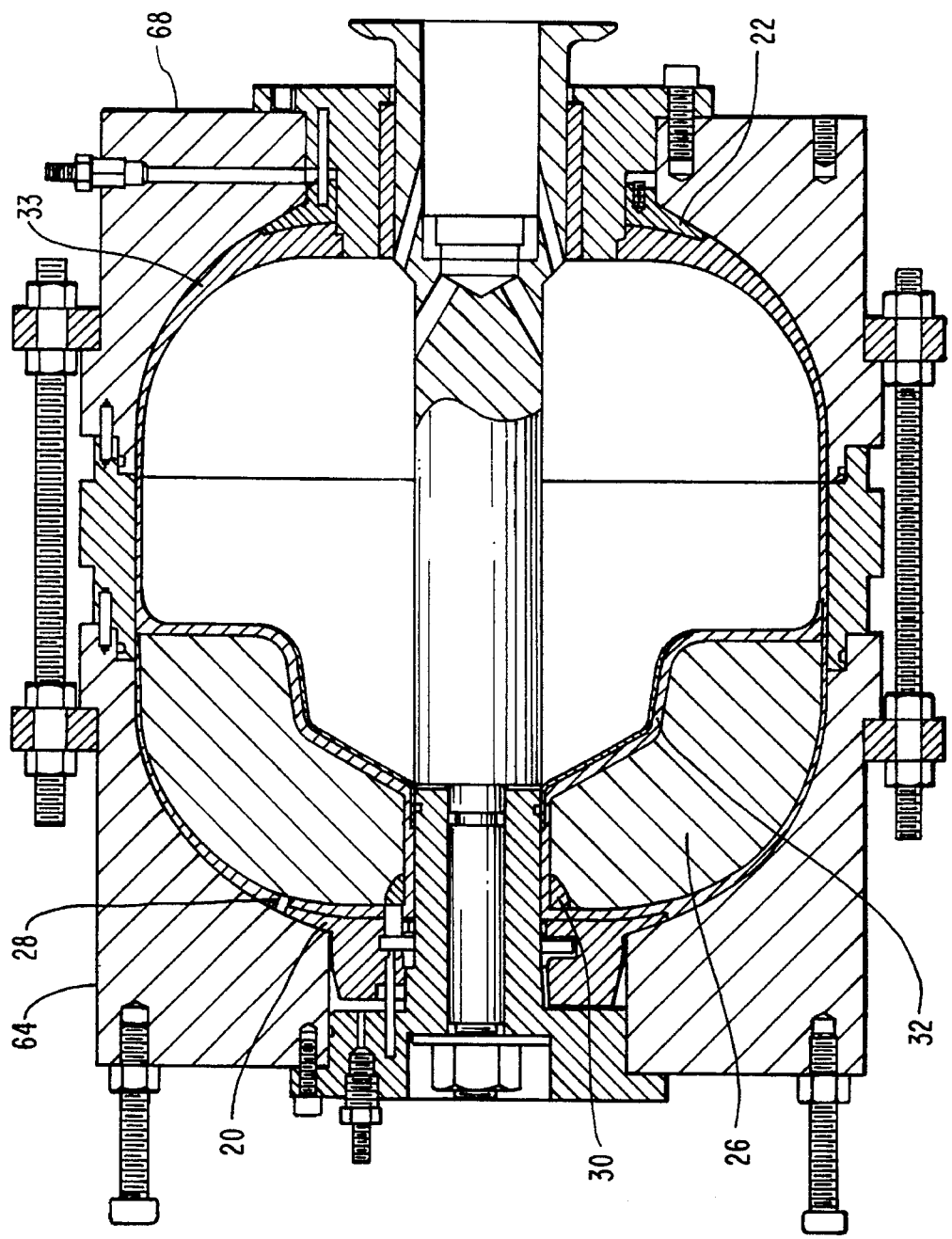
FIG. 5 is a cross-sectional diagram of a casting assembly for forming a Phase 1 grain according to the present invention.

Once the Pulse 2 grain 26 has been cured, the lid 66 is removed from the Pulse 2 casting assembly 64 and the barrier insulator 32 is attached to the Pulse 2 grain 26 and the fore insulator 28, and the fore insulator 28 is trimmed back. Then, the aft insulator 33 is attached to the barrier insulator 32, and as shown in FIG. 5, the Pulse 1 casting tool 68 is attached to the Pulse 2 casting tool 64. Finally, the Pulse 1 grain 24 is cast and cured to obtain a grain assembly.

Before the insulators 28, 32 and 33 are used in this process, the interior surfaces of each are coated with an adhesive liner. Preferably, this liner uses the same binder as the propellant grains 24, 26 and includes a carbon black filler. After two 12.5 mil thick coats of the liner are applied to the exterior of the fore and aft insulators 28 and 33, the liner is cured and covered with a wash coat of isophorone diisocyanate (IPDI) to enhance bondline strength.

Once the grain assembly has been formed, graphite fiber (or any other fiber having a sufficiently high tensile strength, such as steel, etc.) is wound around the grain assembly, coated with an epoxy resin, and cured to form the pressure vessel 12. The polar bosses 20 and 22, skirt 14, motor igniter assembly 36 and TVC nozzle 38 then are attached to the pressure vessel 12.

Although a few preferred embodiments of the invention have been shown and described, it will be appreciated by those skilled in the art that changes may be made in these embodiments without departing from the principles and the spirit of the invention, the scope of which is defined in the appended claims.

What is claimed is:

1. A solid propellant dual phase motor comprising:
   a pressure vessel having an aft opening for release of propellant materials therefrom;
   a first pulse grain disposed in an aft portion of said pressure vessel;
   a second pulse grain disposed in a fore portion of said pressure vessel; and
   igniter means disposed in said fore portion of said pressure vessel for selectively igniting said first pulse grain and said second pulse grain said igniter means comprising a first pulse igniter disposed proximate said first pulse grain and a second pulse igniter disposed proximate said second pulse grain, said second pulse igniter comprising an igniter closure having torodial surfaces disposed therein which define an igniter chamber, said igniter closure comprising at least one nozzle port providing a path from said igniter chamber to said second pulse grain.

2. The motor of claim 1, said first pulse igniter comprising:
   a casing; and
   first ignition grain means for igniting said first pulse grain and for burning said casing.

3. The motor of claim 2, said first ignition grain means comprising:
   at least one primary first igniter grain; and
   a booster first igniter grain.

4. The motor of claim 2, said first ignition grain means comprising:
   at least one igniter grain;
   at least one ignition pellet; and
   a screen separating said at least one ignition pellet and said at least one igniter grain.

5. The motor of claim 2, wherein said casing is made from a material selected from the group consisting of aluminum, steel, and magnesium.

6. The motor of claim 5, wherein said casing is made from aluminum.

7. The motor of claim 1, wherein said second ignition grain means is for igniting said second pulse grain with hot gases.

8. The motor of claim 1, further comprising:
   a grain support supporting said second pulse grain;
   wherein said second ignition grain means is for melting said grain support when said second pulse grain is ignited.

9. The motor of claim 1, said igniter means further comprising:
   at least one first igniter pressure port means connected to said first igniter for detecting a pressure thereof; and
   at least one second igniter pressure port means connected to said second igniter for detecting a pressure thereof.

10. A solid propellant dual phase motor comprising:
    a pressure vessel having an aft opening for release of propellant material therefrom;
    a first pulse grain disposed in an aft portion of said pressure vessel;
    a second pulse grain disposed in a fore portion of said pressure vessel, said first and second pulse grains each having a surface disposed therein which cooperatively define an ignition cavity; and
    igniter means disposed in said ignition cavity for selectively igniting said first pulse grain and said second pulse grain said igniter means comprising a first pulse igniter disposed proximate said first pulse grain and a second pulse igniter disposed proximate said second pulse grain, said second pulse igniter comprising an igniter closure having torodial surfaces disposed therein which define an igniter chamber, said igniter closure comprising at least one nozzle port providing a path from said igniter chamber to said second pulse grain.

11. The motor of claim 10, wherein:
    said first grain has a central portion projecting toward said fore portion of said pressure vessel; and
    said second grain has a central recess accommodating said central portion of said first grain.

* * * * *